3,304,261
MINERAL LUBRICATING OIL COMPOSITIONS CONTAINING TERPOLYMER VISCOSITY INDEX IMPROVERS
Stephan Ilnyckyj, Islington, Ontario, and George A. Holder, Sarnia, Ontario, Canada, assignors to Esso Research and Engineering Company, a corporation of Delaware
No Drawing. Filed Jan. 24, 1966, Ser. No. 522,341
5 Claims. (Cl. 252—56)

The present invention relates to terpolymers which have been found to be particularly useful as viscosity index improvers for mineral lubricating oils. In particular, the present invention relates to the use of a terpolymer of ethylene, a low molecular weight monomeric unsaturated monocarboxylic acid ester, and at least one unsaturated dicarboxylic acid ester in mineral lubricating oils. Mixtures of these three types of components, when terpolymerized in the presence of a peroxide catalyst or other free radical type of catalyst, yield compounds having a number average molecular weight ranging between about 1,000 and about 25,000. In many instances (but not in all), the addition of these types of terpolymers to mineral lubricating oils results in the imparting of as good a viscosity index to the mineral lubricating oil as many products commercially available for such purposes. In addition, a still further advantage, it has been found, results from the fact that the resistance to breakdown, i.e., shear stability, of the so-compounded oils is greatly enhanced. Such attributes make the use of such terpolymers particularly desirable and beneficial where the mineral lubricating oil compositions are to be employed as automatic transmission fluids or as crankcase lubricating oils.

It has heretofore been suggested to copolymerize the unsaturated dicarboxylic acid esters such as fumaric acid esters with vinyl esters of fatty acids. These prior art compositions and processes do give advantages in viscosity index improvement for lubricating oils when the materials are added in the customary amounts, i.e., be-between about .1 and 10 wt. percent. However, in many instances, such additives suffer from the disadvantage of giving copolymers of very low shear stability. Thus, the viscosity index of an oil containing such a copolymer, although initially quite high, after relatively short use in an engine, decreases to the level where it is equal to the viscosity index of the base oil containing no copolymer. Several patents have been issued dealing with the preparation of the vinyl acetate-dialkyl fumarate copolymers and their use in lubricating oils. See U.S. Patents 2,721,879, 2,825,717 and 3,136,743.

As disclosed in U.S. Serial No. 338,007, filed January 16, 1964, now U.S. Patent No. 3,250,714, patented May 10, 1966, by Stephen Ilnyckyj and George A. Holder and entitled, "Ethylene-Vinyl Acetate Copolymers as Viscosity Index Improvers for Mineral Oils," certain copolymers of ethylene and vinyl acetate also act as viscosity index improvers for petroleum lubricating oils. Inasmuch as they are much more resistant to breakdown when sheared, they are superior to the viscosity index improvers discussed above. However, they also show a disadvantage of limited solubility in petroleum lubricating oils.

There is also a considerable amount of information available which deals with the discoveries of the useful properties of ethylene-vinyl acetate copolymers as pour point depressants for the distillate fuels. For example, note U.S. Patents 3,048,479, 3,093,623, 3,126,364 and 3,159,608.

It has now been discovered, however, that the hereinafter described terpolymer compositions which are described and claimed in copending application Serial No. 297,036, filed July 23, 1963 by Stephan Ilnyckyj, now abandoned, when added to mineral lubricating oils in the amount ranging between about 0.1% and about 10.0%, preferably between about 0.5 and about 5.0 wt. percent, results in oils having satisfactorily high viscosity index while at the same time achieving high resistance to shear or shearing breakdown, i.e., having excellent shear stability. The terpolymers are formed from three monomeric components, the first of which is ethylene, the second, an unsaturated aliphatic monocarboxylic acid ester containing 4 to 20 carbon atoms per molecule, and the third, an alpha-beta unsaturated dicarboxylic acid diester of a long chain aliphatic monohydric alcohol. The unsaturated monocarboxylic acid ester is preferably a vinyl fatty acid ester of from 4 to 20 carbon atoms per molecule such as vinyl acetate, however, the alkyl ester of acrylic acid or methacrylic acid are also suitable reactants. Vinyl esters of other acids such as propionic, butyric, lauric, myristic, palmitic, and cocoanut oil mixed acids are also useful.

The unsaturated dicarboxylic acid employed in forming the esters used may be represented by the following formula:

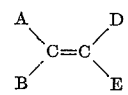

wherein:
(1) A and D are carboxylic acid ester groups

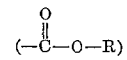

and B and E are hydrogen, e.g., fumaric acid esters, maleic acid esters, etc., or (2) A and D are carboxylic acid ester groups, as above, and either B or E is a methyl group, the other being hydrogen, e.g., citraconic acid esters, mesaconic acid esters, etc., or (3) A and B are hydrogen, D is a carboxylic acid ester group and E is a methylene carboxylic acid ester group, e.g., itaconic acid esters, or (4) A and D are carboxylic acid ester groups as above, E is a methylene carboxylic acid ester group and B is hydrogen, e.g., aconitic acid esters.

It will be noted that the unsaturation in all of these compounds is alpha-beta to at least one carboxy group. Although any of the polycarboxylic acid esters, according to the formula aboxe, or mixtures of such polycarboxylic acid esters, are operable in the process of this invention, the fumaric acid esters and maleic acid esters are particularly advantageous. Mixtures of two or more of such unsaturated polycarboxylic acid esters in varying proportions, i.e., 10–90 parts fumaric and 90–10 parts maleic ester, may be used in place of only one ester.

The alcohol employed in forming the unsaturated dicarboxylic acid ester may be any monohydric alcohol having a long chain aliphatic hydrocarbon radical of from 8 to 18 carbon atoms, for example, octyl, 2-ethylhexyl, decyl, isodecyl, dodecyl (lauryl), tetradecyl, hexadecyl, octadecyl (stearyl) or mixtures of two or more such alcohols such as those obtained by the hydrogenation of cocoanut oil. A particular mixture of alcohols produced from cocoanut oil is sold under the tradename "Lorol" and is a mixture of saturated straight chain alcohols whose molecules contain from 10 to 18 carbon atoms each.

Even some of the alcohols having less than 8 carbon atoms such as hexyl and amyl may be employed providing there is a sufficient amount of the higher alcohols used so as to make a total mixed alcohol product averaging at least as high as 8 carbon atoms per molecule and preferably averaging between 10 and 16 carbon atoms per molecule.

Conventional preparation of the esters such as the fumarates and maleates can be accomplished by direct esterification of the alpha, beta unsaturated dicarboxylic acid or its corresponding anhydride with an alcohol. This is a straightforward conventional condensation reaction usually carried out at a temperature of between about 225° F. and about 375° F. in the presence of about 0.1 to 1.0 wt. percent of sulphuric acid as a catalyst. Organic solvents may or may not be employed as desired. A suitable solvent is an aliphatic hydrocarbon such as heptane, octane, isooctane, or higher boiling paraffinic solvents or mixed paraffins of the desired boiling range. The final esterified product is separated from the reaction mixture by vacuum distillation and the ester water washed and purified in conventional manner.

The shear resisting and viscosity index improvement properties of the terpolymer formed, in mineral lubricating oils, is particularly affected by the relative amounts of the three reactants employed and to some extent by the order of addition of the reactants to the reaction zone. Broadly speaking, for each 100 moles of ethylene, there is employed between about 5 and about 20 moles of the monocarboxylic acid ester, preferably between about 8 and about 15 moles; and finally, between about 1 and about 6 moles of the unsaturated dicarboxylic acid ester, preferably between about 3 and about 5 moles. Such a product has a number average molecular weight of between about 3,500 and about 25,000.

In general, the reaction conditions for terpolymer formation are as follows: the temperature range is between about 260° F. and about 360° F., preferably between about 280° F. and 320° F. and the superatmospheric pressure employed in the reaction vessel, usually accomplished by ethylene pressure, is maintained between about 800 and about 5,000 p.s.i.g., preferably between about 1,000 and about 3,000 p.s.i.g. The reaction is carried out anywhere from about 30 minutes to about 24 hours, preferably between about 3 hours and about 6 hours. It is, of course, apparent that the correlation of the reaction conditions can be varied considerably—the higher the temperature, the higher the ethylene pressure necessary to produce a terpolymer of the desired number average molecular weight. In general, the weight ratio of ethylene to vinyl ester should be maintained between about 2:1 and about 5:1 with a preferred ratio being about 3:1. Products of number average molecular weights in excess of 3,000 are generally prepared using a temperature of 275°–300° F., a pressure of 800–5,000 p.s.i.g., and for a period of time of at least 2 hours. Such products find utility in automotive lubricating oils which are used in crankcases, automatic transmissions or in the fabrication of gear oils, i.e., in oils to be used under conditions where high shearing stresses are encountered.

It is necessary that a free radical type promoter or initiator such as peroxide be employed. In general, the amount of initiator employed during the terpolymerization ranges between about 0.1 and about 10.0 wt. percent, preferably between about 1.0 and about 3.0 wt. percent of the total amount of esters (monocarboxylic plus dicarboxylic ester). Suitable peroxides are those conventionally employed in effecting or activating polymerization or copolymerization reactions. Di-tertiary-butyl peroxide is a very good catalyst. Other representatives of such catalysts or promoters are hydrogen peroxide, benzoyl peroxide, dicumene peroxide, cumene hydroperoxide, lauroyl peroxide, tertiary butyl hydroperoxide, tertiary butyl perbenzoate, ammonium persulfide, and potassium persulfide. Numerous other peroxides commercially available on the market today and sold for use in initiating polymerization reactions may also be employed.

The reaction, for ease of handling, is carried out in any suitable inert organic liquid such as benzene, toluene, hexane, cyclohexane, or similar hydrocarbons. The reactants may be pumped or pressured into the reaction vessel continuously during the course of the reaction or any of the two reactants may be first placed in the reaction vessel and the third reactant thereafter injected into the reactor. The entire amount, for example, of vinyl acetate may be charged as a benzene solution. The temperature of the reaction may then be raised to the desired operating temperature and ethylene then admitted to the reactor so as to maintain the required operating pressure. The dibasic unsaturated ester, such as the maleic or fumaric ester, may then be injected into the reactor over any period of time during the course of the reaction or the unsaturated ester may be simultaneously, i.e., concurrently, introduced with the vinyl acetate solution.

The following examples are given for the purpose of illustrating the invention but it is not intended that the invention should be limited thereby:

*Example 1*

A series of eight runs were carried out. The reactions were carried out in an autoclave which was made oxygen free by being purged first with nitrogen and then with ethylene. In each run 1350 c.c. of benzene was charged to the reactor at the beginning of the run. In each instance the run was carried out as follows: The autoclave containing benzene was brought up to the indicated reaction temperature and pressurized with ethylene to the TABLE I.—PREPARATION OF TERPOLYMERS OF ETHYLENE, VINYL ACETATE AND UNSATURATED ESTERS

|  | Di-lauryl-fumarate | | | | | | Di-i-decyl-fumarate | |
|---|---|---|---|---|---|---|---|---|
|  | 1 | 2 | 3 | 4 | 5 | 6 | 7 | 8 |
| Unsaturated Ester: | | | | | | | | |
| Temperature, ° F | 275 | 275 | 300 | 300 | 300 | 350 | 300 | 300 |
| Ethylene Pressure, p.s.i.g | 900 | 900 | 1,300 | 2,000 | 2,000 | 2,000 | 2,000 | 2,000 |
| Reaction Time, hrs | 6 | 6 | 6 | 6 | 6 | 12 | 6 | 6 |
| Initiator, Di-t-Bu$_2$O$_2$: | | | | | | | | |
| Total, c.c | 15 | 15 | 15 | 15 | 30 | 30 | 15 | 15 |
| C.c./hr | 3.0 | 3.75 | 3.0 | 3.0 | 6.0 | 2.75 | 3.0 | 3.0 |
| For hr | 5 | 4 | 5 | 5 | 5 | 11 | 5 | 5 |
| Vinyl Acetate: | | | | | | | | |
| Total, gm | 200 | 200 | 200 | 200 | 200 | 200 | 200 | 200 |
| At start | 200 | Nil | | | | | | |
| Gm./hr | Nil | 50 | Nil | Nil | Nil | Nil | Nil | Nil |
| For hr | Nil | 4 | | | | | | |
| Unsaturated Ester: | | | | | | | | |
| Total, gm | 105 | 105 | 105 | 105 | 210 | 210 | 105 | 212 |
| Gm./hr | 315 | 26 | 21 | 21 | 42 | 19 | 21 | 45 |
| For hr | 0.33 | 4 | 5 | 5 | 5 | 11 | 5 | 0 |
| Product: | | | | | | | | |
| Yield, gm | 555 | 420 | 1,037 | 1,325 | 1,475 | 1,375 | 1,310 | 1,270 |
| Mol. wt.[1] | 3,200 | 2,700 | 3,900 | 4,600 | 2,800 | 2,200 | | |
| Sap. No | 236.7 | 213.8 | 128.9 | | | | | |

[1] Determined by Cryoscopy Method (in phenanthrene), published by K. Rast in Ber. 55, 1,051, 3,727 (1922).

indicated desired pressure. At that time injection of esters and peroxide was initiated. As the reaction was proceeding constant ethylene pressure was maintained by supplying additional ethylene continuously through an automatic pressure control regulator. Upon the completion of the reaction, which occurred when the ethylene pressure remained constant with adding more ethylene, the contents were cooled and discharged under their own pressure into the receiver. Terpolymer was separated by stripping.

*Example 2*

The viscosity index of each of the eight samples prepared in Example 1 was compounded in the amount of 1 wt. percent in a mineral paraffinic base lubricating oil of SAE–10 grade which had a viscosity at 100° F. of 33 centistokes and a viscosity index of 92. Additionally, these eight terpolymer samples were compared, in the same base oil, with respect to viscosity index with like amounts of two polymers commercially marketed for use as viscosity index improvers.

4, according to Table III, was better in shear stability than Polymer A (43.5% breakdown versus 57.3% breakdown) but was slightly inferior to it as a V.I. improver. Terpolymer 4, however, was inferior to polyisobutylene in shear stability (43.5% breakdown versus 27.6% breakdown) but was superior to polyisobutylene as a viscosity index improver (Table II).

Having now thus fully described and illustrated the nature of the invention, what is desired to be secured by Letters Patent is:

1. A lubricating oil composition comprising a mineral lubricating oil and a viscosity index improving amount of a terpolymer formed from ethylene, an unsaturated aliphatic monocarboxylic acid ester of from 4 to 20 carbon atoms per molecule, and at least one unsaturated dicarboxylic acid diester of a saturated monohydric primary alcohol containing in the range of 8 to 18 carbon atoms per molecule and of an acid selected from the group consisting of alpha-beta unsaturated dicarboxylic acids and their anhydrides.

TABLE II.—TERPOLYMERS OF ETHYLENE VINYL ACETATE AND UNSATURATED ESTERS COMPARED WITH TWO COMMERCIAL POLYMERIC V.I. IMPROVERS AT 1 WEIGHT PERCENT

| Terpolymer | Base Oil | 1 | 2 | 3 | 4 | 5 | 6 | 7 | 8 | Commercial Polymer | |
|---|---|---|---|---|---|---|---|---|---|---|---|
| | | | | | | | | | | A [1] | B [2] |
| Viscosity at 100° F., centistokes | 33 | 36.65 | 36.16 | 40.1 | 46.2 | 49.8 | 37.79 | 41.02 | 41.04 | 49.25 | 47.14 |
| Viscosity at 210° F., centistokes | 5.1 | 5.77 | 5.64 | 6.1 | 7.29 | 7.56 | 5.73 | 6.22 | 6.25 | 8.37 | 7.11 |
| Viscosity Index (V.I.) | 92 | 108 | 104 | 108 | 125 | 122 | 100.5 | 108.5 | 109.5 | 138.0 | 119.0 |

[1] Acryloid 763 (Polymer of lauryl methacrylate of number average molecular weight of 20,000–30,000).
[2] Paratone N (Polyisobutylene of 130,000 number average molecular weight).

*Example 3*

The shear stabilities of terpolymer samples 3 and 4 were measured and compared in a Mid-Continent, light paraffinic, mineral lubricating oil of 43 SSU at 210° F. having a viscosity index of 112.7, using in each instance 3.6 wt. percent of the polymer in the oil. The following Table III shows the comparative percent sonic breakdown as measured by the LIC test 320.11 (1961 A.S.T.M. Standards on Petroleum Products and Lubricants, appendix XII, page 1160).

2. A lubricating oil composition as in claim 1 containing between about 0.1 and about 10.0 wt. percent of the terpolymer.

3. A lubricating oil composition as in claim 2 wherein the monomeric reactants contained in the terpolymer constitute for each 100 moles of ethylene between about 5 and about 20 moles of vinyl acetate, and between about 1 and about 6 moles of diester of the unsaturated dicarboxylic acid.

4. A lubricating oil composition as in claim 2 wherein the dicarboxylic acid ester is di-iso-decyl fumarate.

TABLE III.—SHEAR STABILITIES OF SOME TERPOLYMERS OF ETHYLENE, VINYL ACETATE AND LONGER CHAIN VINYL ESTERS

| Additive | Kinematic Viscosity, Centistokes | | Viscosity Index | Percent Sonic Breakdown |
|---|---|---|---|---|
| | 100° F. | 210° F. | | |
| None | 31.8 | 5.35 | 112.7 | |
| Terpolymer 3 | 57.0 | 9.16 | 135.1 | 9.2 |
| Terpolymer 4 | 105.3 | 16.29 | 139.2 | 43.5 |
| Polymer A | 87.45 | 17.71 | 151.1 | 57.3 |
| Polymer B | 146.15 | 21.22 | 137.1 | 27.6 |
| Polymer C [1] (in 56 SSU at 210° F. oil) | | 22.18 | | 44.8 |

[1] A commercially available terpolymer containing 17.2 weight percent vinyl acetate, 52.6 weight percent di C8 alkyl fumarate, 26.8 weight percent ditallow fumarate, and 3.4 weight percent hydroxyethyl methacrylate, disclosed and claimed in S.N. 222,223 filed September 7, 1962, now U.S. Patent No. 3,234,134 patented February 8, 1966.

Reference to Table II shows that terpolymers 4 and 5 were more potent as V.I. improvers than polyisobutylene though somewhat less potent in that respect than polymer A. On the other hand, by reference to Table III, it will be seen that terpolymer 3 is more effective and terpolymer 4 is less effective as to shear stability (sonic breakdown), than polyisobutylene (Polymer B). Although terpolymer 3 was less effective as a V.I. improver (Table II), it had exceptional shear stability (Table III) showing a sonic breakdown of only 9.2% as compared with 27.6% for polyisobutylene and 57.3% for Polymer A. Terpolymer 5. A lubricating oil composition as in claim 2 wherein the dicarboxylic acid ester is di-lauryl fumarate.

References Cited by the Examiner

UNITED STATES PATENTS 2,993,032   7/1961   Stuart et al. _____ 252—56 X
3,215,657   11/1965   Bereniewicz et al. _ 260—80.5 X DANIEL E. WYMAN, *Primary Examiner.*

W. H. CANNON, *Assistant Examiner.*